United States Patent
Cao et al.

(10) Patent No.: US 12,089,070 B2
(45) Date of Patent: Sep. 10, 2024

(54) METHODS AND DEVICES FOR UPDATING CONFIGURATION INFORMATION OF DOWNSTREAM DEVICES DURING INTER-DONOR MIGRATION

(71) Applicant: ZTE Corporation, Shenzhen (CN)

(72) Inventors: Kun Cao, Shenzhen (CN); Ying Huang, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 198 days.

(21) Appl. No.: 17/942,272

(22) Filed: Sep. 12, 2022

(65) Prior Publication Data

US 2023/0007509 A1    Jan. 5, 2023

Related U.S. Application Data

(63) Continuation of application No. PCT/CN2020/079483, filed on Mar. 16, 2020.

(51) Int. Cl.
*H04W 24/02* (2009.01)
*H04W 76/20* (2018.01)
*H04W 88/08* (2009.01)

(52) U.S. Cl.
CPC ........... *H04W 24/02* (2013.01); *H04W 76/20* (2018.02); *H04W 88/08* (2013.01)

(58) Field of Classification Search
CPC ...... H04W 24/02; H04W 76/20; H04W 88/08
See application file for complete search history.

(56) References Cited

U.S. PATENT DOCUMENTS

2021/0092666 A1* 3/2021 Hampel ............... H04W 40/22
2023/0098848 A1* 3/2023 Ishii ................... H04W 36/0064
                                                          370/216

FOREIGN PATENT DOCUMENTS

CN    110035472 B    7/2019
CN    110582092 A    12/2019
(Continued)

OTHER PUBLICATIONS

Canadian First Examination Report regarding 3,171,553 dated Nov. 29, 2023, 6 pages.
(Continued)

*Primary Examiner* — Wayne H Cai
(74) *Attorney, Agent, or Firm* — Crowell & Moring LLP

(57) ABSTRACT

The present disclosure describes methods, systems, and devices for updating configuration information for a downstream device of a migrating integrated access backhaul node (IAB-node) during an inter-donor migration from a source IAB-donor to a target IAB-donor. The method includes providing, by an IAB-donor central unit (CU), updated configuration information into system information which is contained in a system information block (SIB) other than SIB1 carried in a SystemInformation (SI) message, and encoding the system information with the updated configuration information. The method also include sending, by the IAB-donor CU, the system information including the updated configuration information as a radio resource control (RRC) container to a migrating IAB-node distributed unit (DU) via F1-AP. The method further includes the migrating IAB-node DU forwards the system information including the updated configuration information through a dedicated RRC message to the downstream device.

20 Claims, 19 Drawing Sheets

(56) References Cited

FOREIGN PATENT DOCUMENTS

| WO | WO 2019159107 A1 | 8/2019 |
|----|------------------|--------|
| WO | WO2020039346 A1  | 2/2020 |
| WO | WO2020039400 A1  | 2/2020 |

OTHER PUBLICATIONS

Extended European Search Report regarding EP 20 89 6918 dated Jun. 6, 2023, 13 pages.
CATT, "(TP for NR_IAB BL CR for TS 38.401) Inter-CU IAB-node migration," 3GPP Draft; R3-196959, 3rd Generation Partnership Project (3GPP), Mobile Competence Centre; 650, Route Des Lucioles, F 06921 Sophia-Antipolis Cedex, France, vol. RAN WG3, No. Reno, NV, USA; Nov. 18, 2019-Nov. 22, 2019, Nov. 8, 2019, XP051820619, Retrieved from the Internet: https:ftp.3gpp.org/tsg_ran/WG3_lu/TSGR3_106/Docs/R3-196959.zip R3196959 (TPfor NR_IAB BL CR for TS 38.401) Inter-CU IAB-node migration.doc.
ZTE et al, "Discussion on network-controlled IAB migration handling," 3GPP Draft; R3-193654 Discussion on Network-Controlled IAB Migration Holding, 3rd Generation Partnership Project (3GPP), Mobile Competence Centre; 650, Route Des Lucioles; F-06921 Sophia-Antipolis, vol. RAN WG3, No. Ljubljana, Slovenija, Aug. 26, 2019-Aug. 30, 2019, Aug. 17, 2019, XP051769858, Retrieved from the Internet: URL:http://www.3gpp.org/ftp/tsg_ran/WG3_lu/TSGR3_105/Docs/R3-193654.zip.
Qualcomm Incorporated, "CB: #49_Ernail049-IAB_rnigration_criteria," 3GPP Draft; R3-201147, 3rd Generation Partnership Project (3GPP), Mobile Competence Centre; 650, Route Des Lucioles, F-06921 Sophia-Antipolis Cedex, France, vol. RAN WG3, No. Electronic Meeting; Feb. 24, 2020-Mar. 6, 2020, Mar. 8, 2020, XP051861478, Retrieved from the Internet: URL:https://ftp.3gpp.org/tsg_ran/WG3_lu/TSGR3_107_e/Docs/R3-201147.zip R3201147 CB49_49_ernail049-IAB_rnigration_FINAL.docx.
Indian Office Action regarding 20221705249 dated Mar. 22, 2024, 6 pages.
Japanese Official Action and English Translation regarding 2022-555642 dated Aug. 28, 2023, 7 pages.
Japanese Notice of Allowance with English translation regarding Japanese Patent Application No. 2022-555642 dated Jan. 12, 2024, 6 pages.
Chinese version of the First Office Action with English translation regarding Application No. 2020800983035, dated Mar. 29, 2024, 24 pages.
ZTE, Sanechips, "Discussion on network-controlled IAB migration handling," R3-195695, 3GPP TSG RAN WG3, Meeting #105bis, Oct. 4, 2019, 5 pages.
International Search Report and Written Opinion regarding PCT/CN2020/079483 dated Dec. 8, 2020, 6 pages.

\* cited by examiner

```
                                    ┌──────────────────────────────────────────────────────────────┐
                                    │ providing, by a IAB-donor central unit (CU), updated         │
                                    │ configuration information into system information which is   │
                                    │ contained in a system information block (SIB) other than     │
                                    │ SIB1 carried in SystemInformation (SI) message, and encoding │
                                    │ the system information with the updated configuration        │
                                    │ information;                                                 │
                                    │                                                         510  │
                                    └──────────────────────────────────────────────────────────────┘
                                                              │
                                                              ▼
                                    ┌──────────────────────────────────────────────────────────────┐
                                    │ sending, by the IAB-donor CU, the system information         │
                                    │ including the updated configuration information as a radio   │
                                    │ resource control (RRC) container to a migrating IAB-node     │
                                    │ distributed unit (DU) via F1-AP                              │
                                    │                                                         520  │
                                    └──────────────────────────────────────────────────────────────┘
                                                              │
                                                              ▼
                                    ┌──────────────────────────────────────────────────────────────┐
                                    │ the migrating IAB-node DU forwards the system information    │
                                    │ including the updated configuration information through a    │
                                    │ dedicated RRC message to the downstream device               │
                                    │                                                         530  │
                                    └──────────────────────────────────────────────────────────────┘
```

FIG. 5A

550 providing, by a migrating IAB-node distributed unit (DU), updated configuration information into system information which is contained in a master information block (MIB) or a system information block-1 (SIB1), and encoding the system information with the updated configuration information;
560

sending, by the migrating IAB-node DU, the system information contained in the MIB or the SIB1 to the downstream device through a dedicated RRC message
570

FIG. 5B

700 providing, by an IAB-donor central unit (CU), updated configuration information into system information which is contained in a system information block (SIB) other than SIB1 carried in SystemInformation (SI) message, and encoding the system information with the updated configuration information;
710 sending, by the IAB-donor CU, the system information including the updated configuration information as a radio resource control (RRC) container to a migrating IAB-node distributed unit (DU) via F1-AP;
720 the migrating IAB-node DU periodically broadcasts the SystemInformation (SI) message including the updated configuration information to the downstream device
730

FIG. 7A

750 providing, by a migrating IAB-node distributed unit (DU), updated configuration information into system information which is contained in a master information block (MIB) or a system information block-1 (SIB1), and encoding the system information with the updated configuration information;
760 periodically broadcasting, by the migrating IAB-node DU, the system information in the MIB or the SIB1 to the downstream device
770

FIG. 7B

900 providing, by a migrating IAB-node distributed unit (DU), updated configuration information into a RRCReconfigeration message;
910 sending, by the migrating IAB-node DU, the RRCReconfigeration message including the updated configuration information to the downstream device.
920

FIG. 9

1100 providing, by a migrating IAB-node distributed unit (DU), updated configuration information into a backhaul adaptation protocol (BAP) control protocol data unit (PDU);
1110 sending, by the migrating IAB-node DU, the BAP control PDU including the updated configuration information to the downstream device
1120

FIG. 11

1300 providing, by a migrating IAB-node distributed unit (DU), updated configuration information into a medium access control (MAC) control element (CE)
1310 sending, by the migrating IAB-node DU, the MAC CE including the updated configuration information to the downstream device
1320

FIG. 13

METHODS AND DEVICES FOR UPDATING CONFIGURATION INFORMATION OF DOWNSTREAM DEVICES DURING INTER-DONOR MIGRATION

CROSS-REFERENCE TO RELATED APPLICATION

This application is a continuation application of PCT International Patent Application No. PCT/CN2020/079483, filed with the China National Intellectual Property Administration, PRC on Mar. 16, 2020, which is herein incorporated by reference in its entirety.

TECHNICAL FIELD

The present disclosure is directed generally to wireless communications. Particularly, the present disclosure relates to methods and devices for updating configuration information of a downstream device during inter-donor migration.

BACKGROUND

Wireless communication technologies are moving the world toward an increasingly connected and networked society. Compared with long term evolution (LTE), the fifth generation (5G) new radio (NR) technology have a much wider spectrum, for example, including millimeter wave (mmWave) frequency bands. With the development of massive multiple input multiple output (MIMO) and/or multiple-beam systems, the 5G NR may provide a much faster speed and much shorter latency.

The 5G NR may include an integrated access backhaul (IAB) implementation. The IAB implementation may include one or more IAB-donors and multiple connecting IAB-nodes. Currently, there are problems and/or issues associated with configuring IAB nodes, particularly when one IAB node migrates from one IAB-donor to another IAB-donor.

The present disclosure may address at least some of problems/issues associated with the existing system to improve the performance of the wireless communication.

SUMMARY

This document relates to methods, systems, and devices for wireless communication, and more specifically, for updating configuration information for a downstream device of a migrating integrated access backhaul node (IAB-node) during inter-donor migration.

In one embodiment, the present disclosure describes a method for wireless communication. The method includes updating configuration information for a downstream device of a migrating integrated access backhaul node (IAB-node) during an inter-donor migration from a source IAB-donor to a target IAB-donor by providing, by an IAB-donor central unit (CU), updated configuration information into system information which is contained in a system information block (SIB) other than SIB1 carried in a SystemInformation (SI) message, and encoding the system information with the updated configuration information; and sending, by the IAB-donor CU, the system information including the updated configuration information as a radio resource control (RRC) container to a migrating IAB-node distributed unit (DU) via F1-AP, so that the migrating IAB-node DU forwards the system information including the updated configuration information through a dedicated RRC message to the downstream device.

In another embodiment, the present disclosure describes a method for wireless communication. The method includes updating configuration information for a downstream device of a migrating integrated access backhaul node (IAB-node) during an inter-donor migration from a source IAB-donor to a target IAB-donor by providing, by a migrating IAB-node distributed unit (DU), updated configuration information into system information which is contained in a master information block (MIB) or a system information block-1 (SIB1), and encoding the system information with the updated configuration information; and sending, by the migrating IAB-node DU, the system information contained in the MIB or the SIB1 to the downstream device through a dedicated RRC message.

In another embodiment, the present disclosure describes a method for wireless communication. The method includes updating configuration information for a downstream device of a migrating integrated access backhaul node (IAB-node) during an inter-donor migration from a source IAB-donor to a target IAB-donor by providing, by an IAB-donor central unit (CU), updated configuration information into system information which is contained in a system information block (SIB) other than SIB1 carried in a SystemInformation (SI) message, and encoding the system information with the updated configuration information; and sending, by the IAB-donor CU, the system information including the updated configuration information as a radio resource control (RRC) container to a migrating IAB-node distributed unit (DU) via F1-AP, so that the migrating IAB-node DU periodically broadcasts the SystemInformation (SI) message including the updated configuration information to the downstream device.

In another embodiment, the present disclosure describes a method for wireless communication. The method includes updating configuration information for a downstream device of a migrating integrated access backhaul node (IAB-node) during an inter-donor migration from a source IAB-donor to a target IAB-donor by providing, by a migrating IAB-node distributed unit (DU), updated configuration information into system information which is contained in a master information block (MIB) or a system information block-1 (SIB1), and encoding the system information with the updated configuration information; and periodically broadcasting, by the migrating IAB-node DU, the system information in the MIB or the SIB1 to the downstream device.

In another embodiment, the present disclosure describes a method for wireless communication. The method includes updating configuration information for a downstream device of a migrating integrated access backhaul node (IAB-node) during an inter-donor migration from a source IAB-donor to a target IAB-donor by providing, by a migrating IAB-node distributed unit (DU), updated configuration information into a RRCReconfigeration message; and sending, by the migrating IAB-node DU, the RRCReconfigeration message including the updated configuration information to the downstream device.

In another embodiment, the present disclosure describes a method for wireless communication. The method includes updating configuration information for a downstream device of a migrating integrated access backhaul node (IAB-node) during an inter-donor migration from a source IAB-donor to a target IAB-donor by providing, by a migrating IAB-node distributed unit (DU), updated configuration information into a backhaul adaptation protocol (BAP) control protocol data unit (PDU); and sending, by the migrating IAB-node DU, the BAP control PDU including the updated configuration information to the downstream device.

In another embodiment, the present disclosure describes a method for wireless communication. The method includes updating configuration information for a downstream device of a migrating integrated access backhaul node (IAB-node) during an inter-donor migration from a source IAB-donor to a target IAB-donor by providing, by a migrating IAB-node distributed unit (DU), updated configuration information into a medium access control (MAC) control element (CE), and sending, by the migrating IAB-node DU, the MAC CE including the updated configuration information to the downstream device.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 5A shows a flow diagram of a method for wireless communication.

FIG. 5B shows a flow diagram of a method for wireless communication.

FIG. 7A shows a flow diagram of a method for wireless communication.

FIG. 7B shows a flow diagram of a method for wireless communication.

FIG. 9 shows a flow diagram of a method for wireless communication.

FIG. 11 shows a flow diagram of a method for wireless communication.

FIG. 13 shows a flow diagram of a method for wireless communication.

DETAILED DESCRIPTION

Figure 1A:
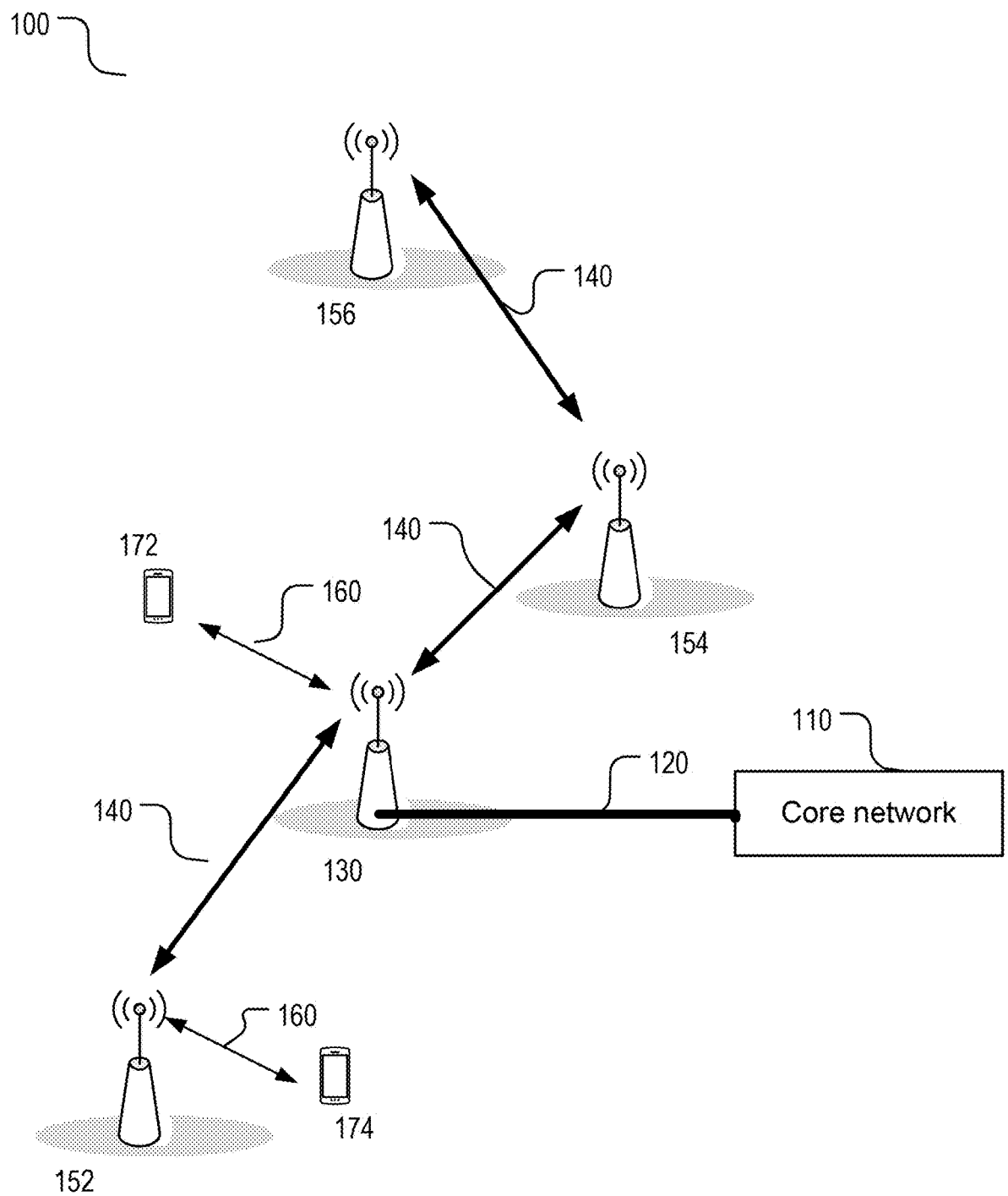
FIG. 1A shows an example of a wireless communication system include an integrated access backhaul (IAB) system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for updating configuration information for a downstream device of a migrating integrated access backhaul node (IAB-node) during inter-donor migration.

Next generation (NG), or 5th generation (5G), wireless communication may provide a range of capabilities from downloading with fast speeds to support real-time low-latency communication. Compared with long-term evolution (LTE), the 5G new radio (NR) technology have a much wider spectrum, for example, including millimeter wave (mmWave) frequency bands. With the development of massive multiple input multiple output (MIMO) and/or multiple-beam systems, the 5G NR may provide a much faster speed and much shorter latency. The 5G NR may include a development of an integrated access backhaul (IAB) implementation. The IAB implementation may include one or more IAB-donors and multiple connecting IAB-nodes. The IAB implementation may communicate between one or more IAB-donors and one or more IAB-nodes via wireless backhaul and relay links. The IAB implementation may provide a flexible NR cell configuration and increase cell density without increasing the density of IAB-donors.

An IAB system may include one or more IAB-donors and one or more IAB-nodes, which collectively provide wireless connection service to one or more user equipment (UEs) (e.g., smartphones). The IAB-donors and IAB-nodes may be wireless network base stations including a NG radio access network (NG-RAN) base station, which may include a nodeB (NB, e.g., a gNB) in a mobile telecommunications context. The IAB-donor may provide access backhaul to one or more connecting child IAB-nodes, and may connect to a core network via a wired communication. In one implementation, the core network may include a 5G core network (5GC). In another implementation, the wired communication may include a fiber transport communication. The IAB-node may include wireless access link and wireless backhaul link. The wireless access link may be used for communication between a UE and the IAB-node. The wireless backhaul link may be used for communication between the IAB-node and the IAB-donor, and/or communications between one IAB-node with another IAB-node. Thus, the IAB-node does not need a wired communication network for data backhaul. In some implementations, the IAB-node does not include a wired communication network for data backhaul, so that IAB-node are more flexible and easier to implement, mitigating the burden of implementing wired communication network. The access link and backhaul link may use transmission bands with same frequency (known as in-band relay), or use transmission bands with different frequency (known as out-band relay).

Figure 1B:
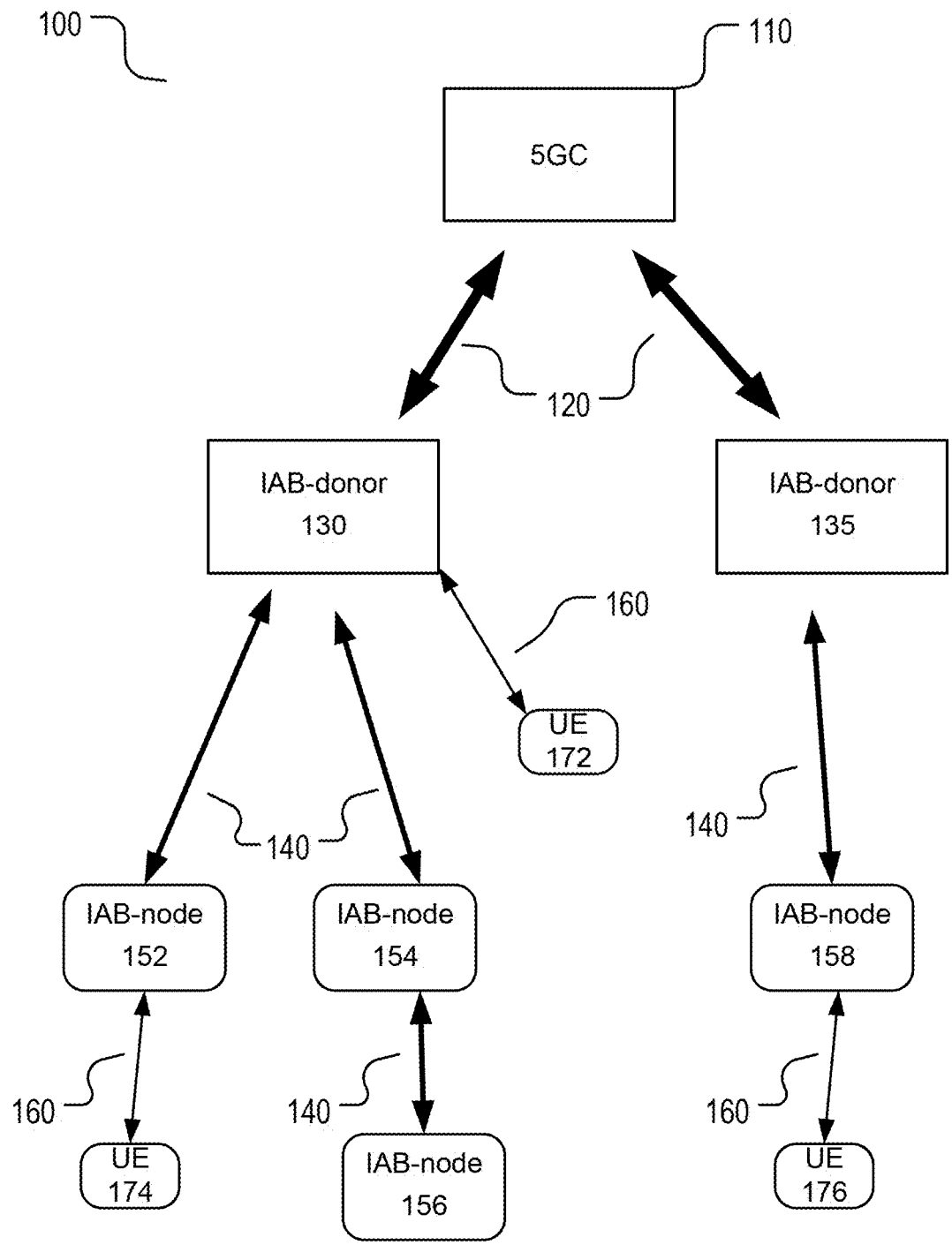
FIG. 1B shows another example of an architecture of an IAB system.

Referring to FIGS. 1A and 1B, the IAB-donor 130 may provide access backhaul 140 to one or more connecting child IAB-nodes (152 and 154). The IAB-donor 130 may connect to a core network 110 via a wired communication 120. In one implementation, the core network 110 may include a 5G core network (5GC). In another implementation, the wired communication 120 may include a fiber transport communication.

An IAB-donor may provide a wireless connection to one or more user equipment (UE). The UE may be a mobile device, for example, a smart phone or a mobile communication module disposed in a vehicle. For example, the IAB-donor 130 may provide a wireless connection 160 to a UE 172.

Similarly and without limitation, a child IAB-node may provide a wireless connection to one or more UEs. For example, the IAB-node 152 may provide a wireless connection 160 to a UE 174.

Similarly and without limitation, a child IAB-node may provide access backhaul to one or more connecting grandchild IAB-nodes. For example, the IAB-node 154 may provide access backhaul 140 to an IAB-node 156. Similarly and without limitation, the grandchild IAB-nodes may also provide access backhaul to one or more connecting great-grandchild IAB-nodes and/or provide wireless connection to one or more UEs.

Referring to FIG. 1B, the IAB system 100 may include more than one IAB-donors (130 and 135). Each of the IAB-donors may connect to a core network (e.g., 5GC) 110 via a wired communication 120. In one implementation, the IAB-donor 135 may provide access backhaul 140 to one or more connecting child IAB-nodes 158; and the IAB-node 158 may provide a wireless connection 160 to one or more UE 176.

The IAB-node 156, which currently connects to the IAB-donor 130 via the IAB-node 154, may migrate to the IAB-donor 135. This may be called as an inter-donor migration and the IAB-node 156 may be called as a migrating IAB-node. Currently, there are problems and/or issues associated with configuring the migrating IAB node during inter-donor migration.

The present disclosure describes embodiments of methods and devices of updating configuration information for a downstream device of a migrating IAB-node during inter-donor migration, addressing at least some of the problems discussed above.

Figure 2:
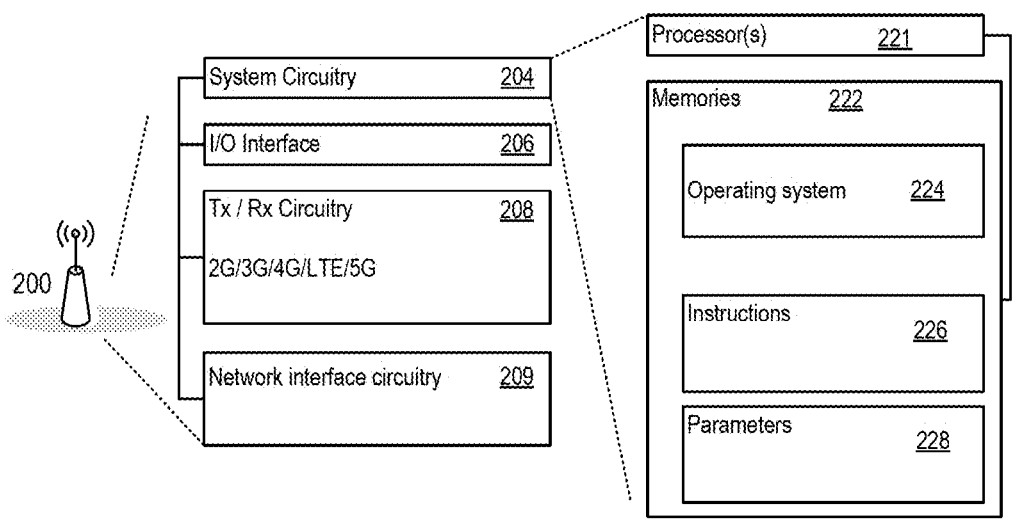
FIG. 2 shows an example of an IAB-donor or IAB-node.

FIG. 2 shows an exemplary wireless communication base station 200. The wireless communication base station 200 may be an exemplary implementation of at least one of the IAB-donors (130 and 135) and the IAB-nodes (152, 154, 156, and 158) in FIGS. 1A and 1B. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
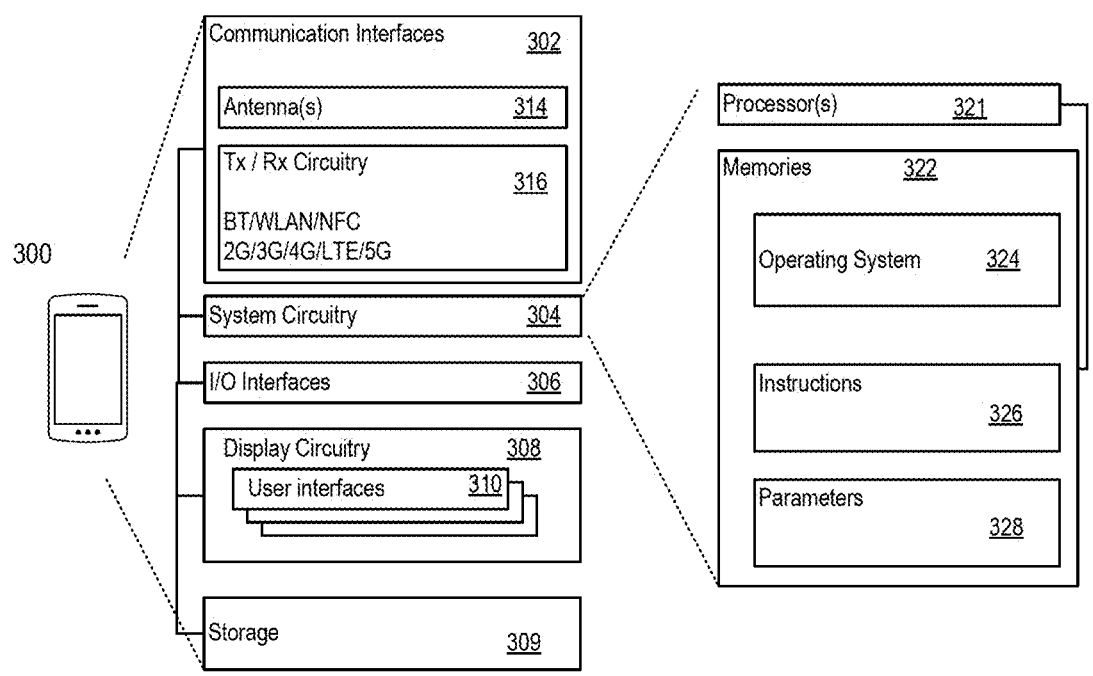
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may be an exemplary implementation of at least one of the UEs (172, 174, and 176) in FIGS. 1A and 1B. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for updating configuration information for a downstream device of a migrating IAB-node during inter-donor migration, which may be implemented, partly or totally, on one or more wireless network base station and/or one or more user equipment described above in FIGS. 2 and 3.

Figure 4:
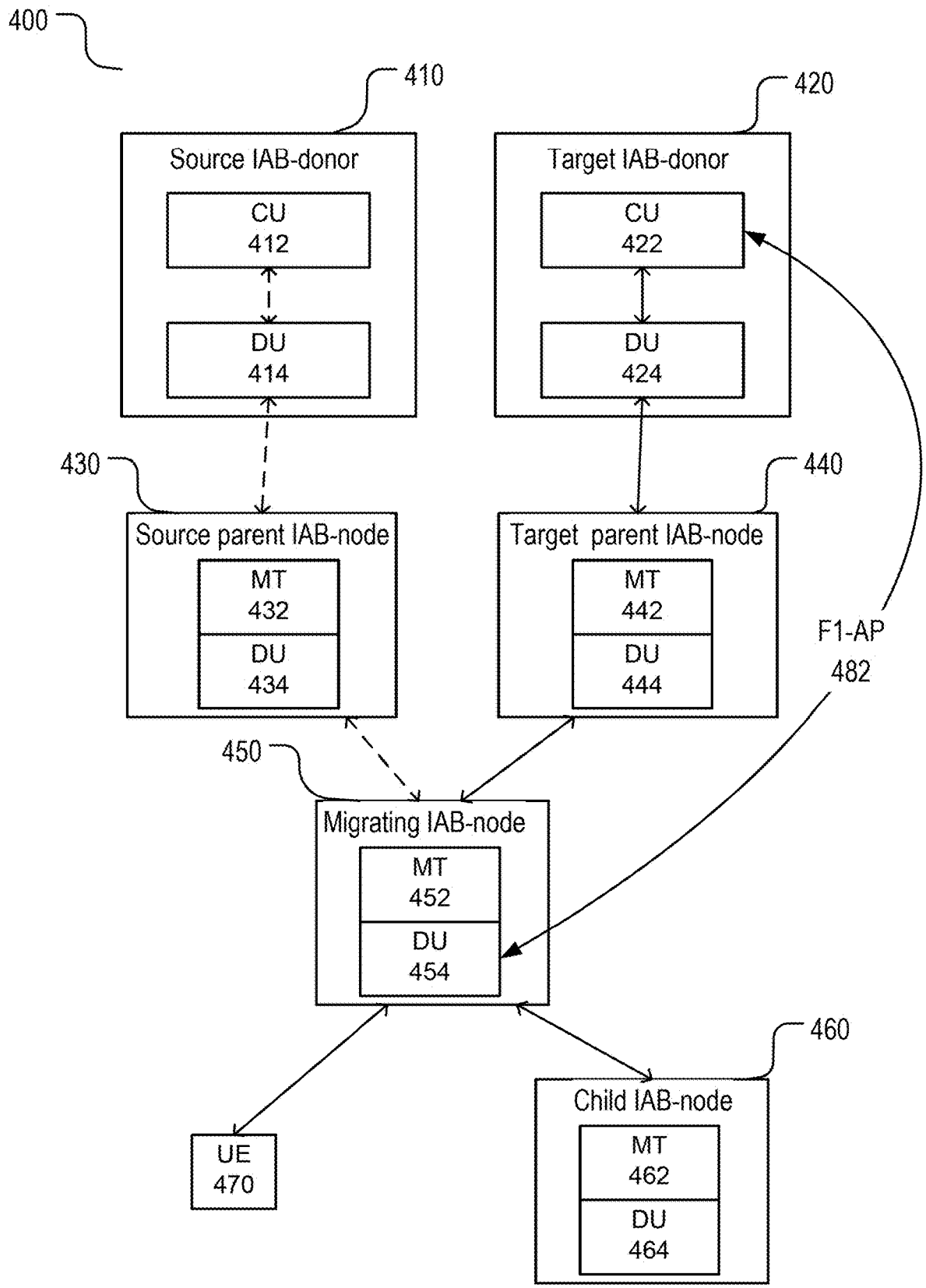
FIG. 4 shows a schematic diagram of a migrating IAB-node in an inter-donor migration.

Referring to FIG. 4, an IAB system 400 may include two IAB-donors (410 and 420). An IAB-node 450, which currently connects to the IAB-donor 410 via an IAB-node 430, may migrate to the IAB-donor 420 via an IAB-node 440. This may be called an inter-donor migration. The IAB-node 450 may be a migrating IAB-node; the IAB-donor 410 may be a source IAB-donor; the IAB-node 430 may be a source parent IAB-node; the IAB-donor 420 may be a target IAB-donor; the IAB-node 440 may be a target parent IAB-node.

The source IAB-donor 410 may include a central unit (CU) 412 and a distributed unit (DU) 414, and the source IAB-donor CU 412 may communicate with the source IAB-donor DU 414. The source parent IAB-node 430 in communication with the source IAB-donor 410 may include a mobile termination (MT) 432 and a distributed unit (DU) 434. The target IAB-donor 420 may include a CU 422 and a DU 424, and the target IAB-donor CU 422 may communicate with the target IAB-donor DU 424. The target IAB-node 440 in communication with the target IAB-donor 420 may include a MT 442 and a DU 444.

Prior to inter-donor migration, the migrating IAB-node 450 may be in communication with the source parent IAB-node 430. The migrating IAB-node 450 may include a MT 452 and a DU 454. In one implementation, the migrating IAB-node 450 may be in communication with a UE 470. In another implementation, the migrating IAB-node 450 may be in communication with a child IAB-node 460. The child IAB-node 460 may include a MT 462 and a DU 464.

Referring to FIG. 4, the migrating IAB-node 450 may change its attachment point from the source parent IAB-node 430 connecting to the source IAB-donor 410 to a target IAB-node 440 connecting to the target IAB-donor 420. In one implementation, a handover (HO) process may occur during the inter-donor migration, and this may be an inter-CU HO scenario. The migrating IAB-node DU 454 may communicate with the target IAB-donor CU 422 via F1-AP 482.

Referring to FIGS. 5A and 5B, the present disclosure describes various embodiment of methods for using a radio resource control (RRC) message to update configuration information for a downstream device of a migrating IAB-node during inter-donor migration. In one implementation, the downstream device may include one or more user equipment (UE) and/or one or more child IAB-node mobile termination (MT). The updated configuration information may include at least one of a new radio (NR) physical cell identifier (PCI), or a NR cell global identifier (CGI).

Referring to FIG. 5A, a method 500 may include a portion or all of the following steps: step 510: providing, by an IAB-donor central unit (CU), updated configuration information into system information which is contained in a system information block (SIB) other than SIB1 carried in a SystemInformation (SI) message, and encoding the system information with the updated configuration information; step 520: sending, by the IAB-donor CU, the system information including the updated configuration information as a radio resource control (RRC) container to a migrating IAB-node distributed unit (DU) via F1-AP; and step 530: the migrating IAB-node DU forwards the system information including the updated configuration information through a dedicated RRC message to the downstream device.

Referring to FIG. 5B, a method 550 may include a portion or all of the following steps: step 560: providing, by a migrating IAB-node distributed unit (DU), updated configuration information into system information which is contained in a master information block (MIB) or a system information block-1 (SIB1), and encoding the system information with the updated configuration information; and step 570: sending, by the migrating IAB-node DU, the system information contained in the MIB or the SIB1 to the downstream device through a dedicated RRC message.

Figure 6A:
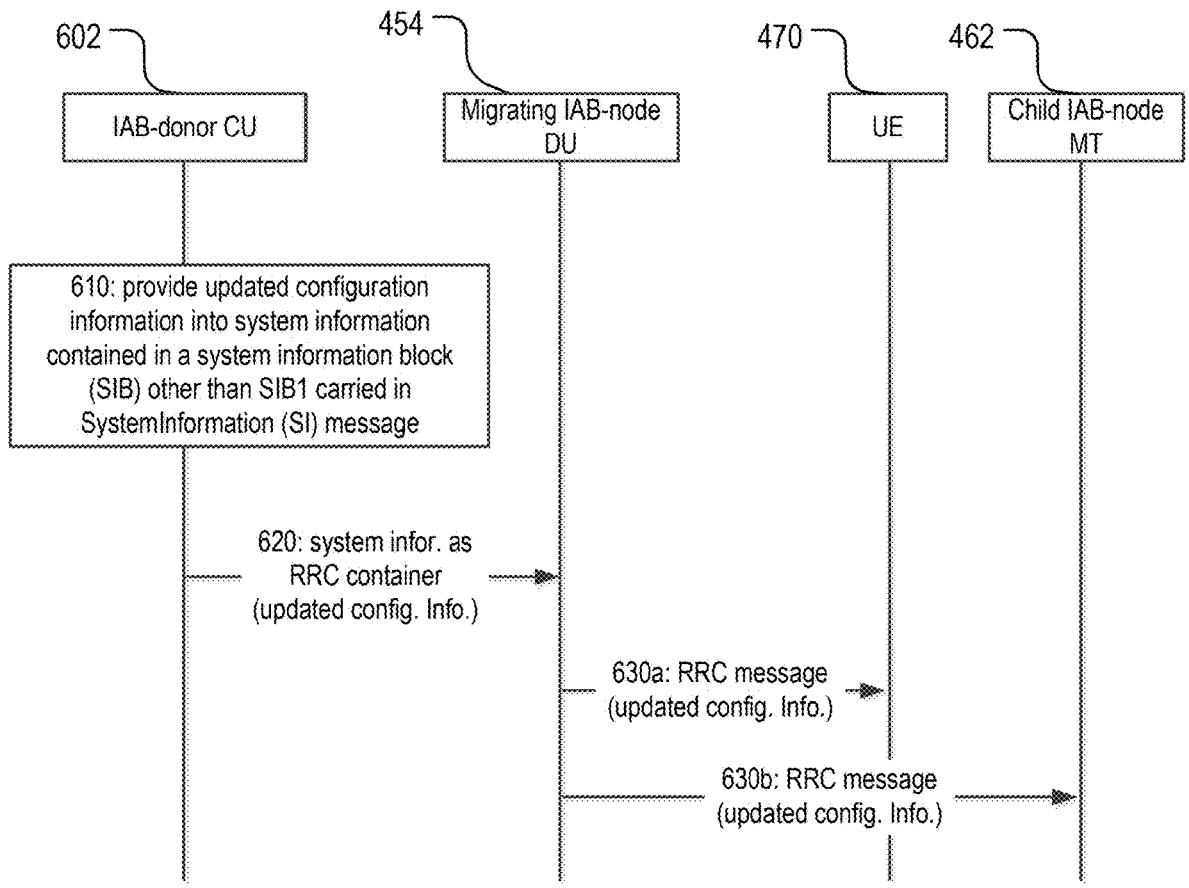
FIG. 6A shows an exemplary logic flow of the method for wireless communication in FIG. 5A.
Figure 6B:
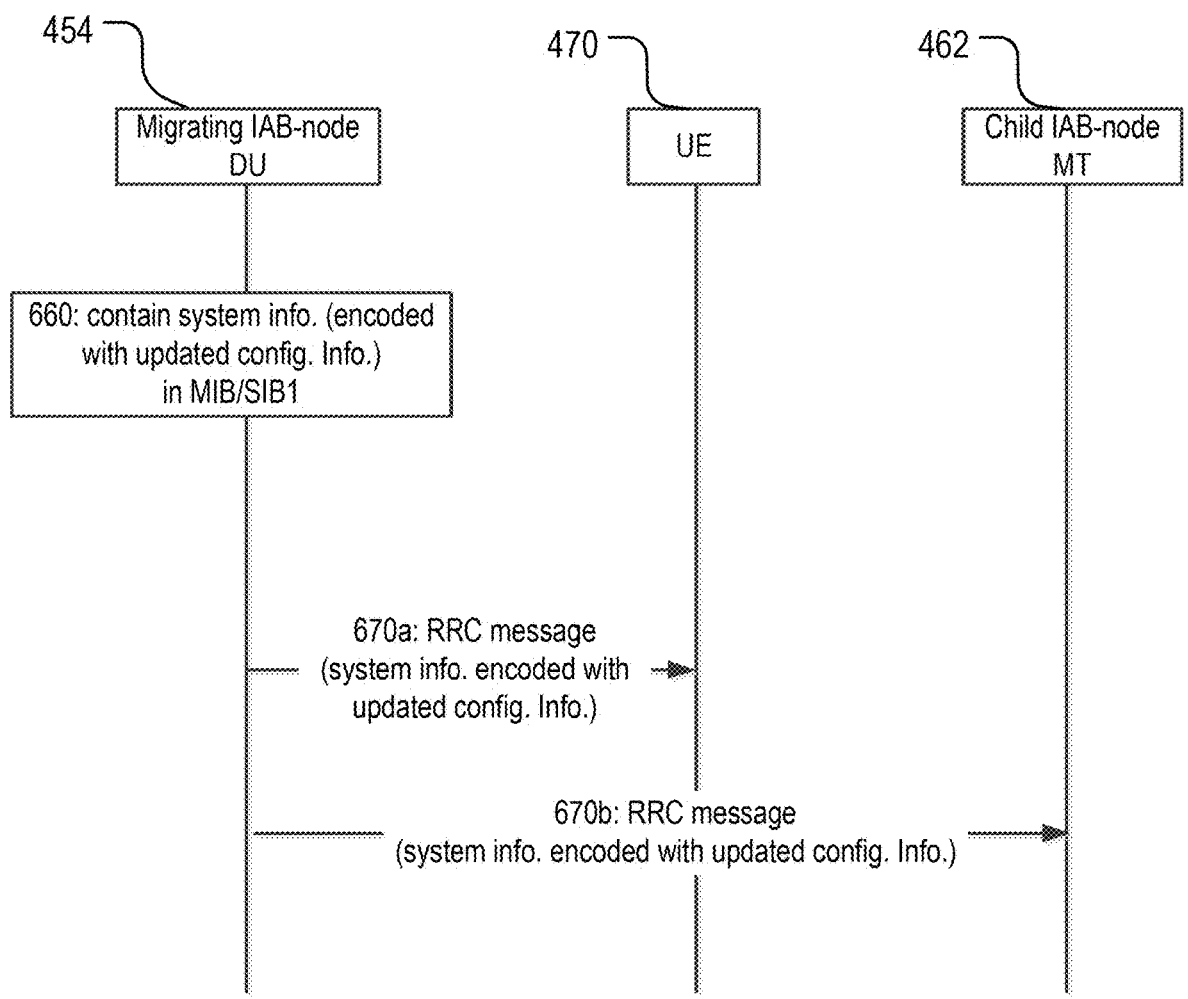
FIG. 6B shows an exemplary logic flow of the method for wireless communication in FIG. 5B.

FIGS. 6A and 6B show logic flows of various methods for using a RRC message to update configuration information for a downstream device of a migrating IAB-node during inter-donor migration.

Referring to step 610 in FIG. 6A, a IAB-donor CU 602 may provide updated configuration information into system information which is contained in a system information block (SIB) other than SIB1 carried in a SystemInformation (SI) message, and encoding the system information with the updated configuration information. In one implementation, the IAB-donor CU 602 may include a source IAB-donor CU. In another implementation, the IAB-donor CU 602 may include a target IAB-donor CU.

Referring to step 620 in FIG. 6A, the IAB-donor CU 602 may send the system information as a radio resource control (RRC) container to a migrating IAB-node distributed unit (DU) 454 via F1-AP. The system information includes the updated configuration information.

Referring to step 630a in FIG. 6A, upon receiving the system information as the RRC container, the migrating IAB-node DU 454 may forward the system information including the updated configuration information through a dedicated RRC message to the downstream UE 470. The updated configuration information may include one or more of the following: a new radio (NR) physical cell identifier (PCI), or a NR cell global identifier (CGI).

Referring to step 630b in FIG. 6A, upon receiving the system information as the RRC container, the migrating IAB-node DU 454 may forward the system information including the updated configuration information through a dedicated RRC message to the downstream child IAB-node MT 462. The updated configuration information may include one or more of the following: a new radio (NR) physical cell identifier (PCI), or a NR cell global identifier (CGI).

In one implementation, step 630a may be performed earlier than step 630b. In another implementation, step 630a may be performed later than step 630b.

Optionally and alternatively, referring to step 660 in FIG. 6B, the migrating IAB-node distributed unit (DU) 454 may provide updated configuration information into system information which is contained in a master information block (MIB) or a system information block-1 (SIB1), and may encode the system information with the updated configuration information. Referring to step 670a in FIG. 6B, the migrating IAB-node DU 454 may send the system information contained in the MIB or the SIB1 to the downstream UE 470 through a dedicated RRC message. Referring to step 670b in FIG. 6B, the migrating IAB-node DU 454 may send the system information contained in the MIB or the SIB1 to the downstream child IAB-node MT 462 through a dedicated RRC message. The updated configuration information may include one or more of the following: a new radio (NR) physical cell identifier (PCI), or a NR cell global identifier (CGI). In one implementation, step 670a may be performed earlier than step 670b. In another implementation, step 670a may be performed later than step 670b.

Referring to FIGS. 7A and 7B, the present disclosure describes various embodiment of methods for broadcasting updated configuration information for a downstream device of a migrating IAB-node during inter-donor migration. In one implementation, the downstream device may include one or more user equipment (UE) and/or one or more child IAB-node mobile termination (MT). The updated configuration information may include at least one of a new radio (NR) physical cell identifier (PCI), or a NR cell global identifier (CGI).

Referring to FIG. 7A, a method 700 may include a portion or all of the following steps: step 710: providing, by an IAB-donor central unit (CU), updated configuration information into system information which is contained in a system information block (SIB) other than SIB1 carried in a SystemInformation (SI) message, and encoding the system information with the updated configuration information; step 720: sending, by the IAB-donor CU, the system information including the updated configuration information as a radio resource control (RRC) container to a migrating IAB-node distributed unit (DU) via F1-AP; and step 730: the migrating IAB-node DU periodically broadcasts the SystemInformation (SI) message including the updated configuration information to the downstream device.

Referring to FIG. 7B, a method 750 may include a portion or all of the following steps: step 760: providing, by a migrating IAB-node distributed unit (DU), updated configuration information into system information which is contained in a master information block (MIB) or a system information block-1 (SIB1), and encoding the system information with the updated configuration information; and step 770: periodically broadcasting, by the migrating IAB-node DU, the system information in the MIB or the SIB1 to the downstream device.

Figure 8A:
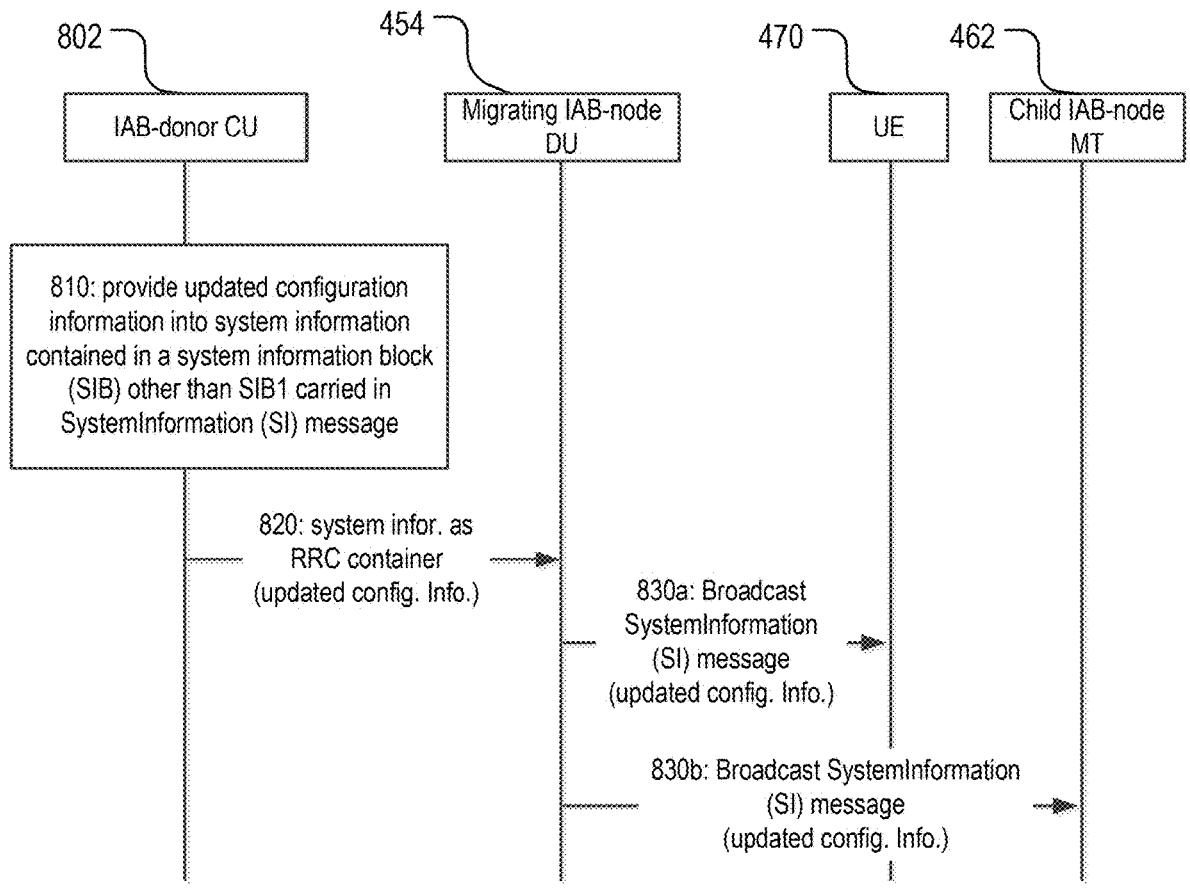
FIG. 8A shows an exemplary logic flow of the method for wireless communication in FIG. 7A.
Figure 8B:
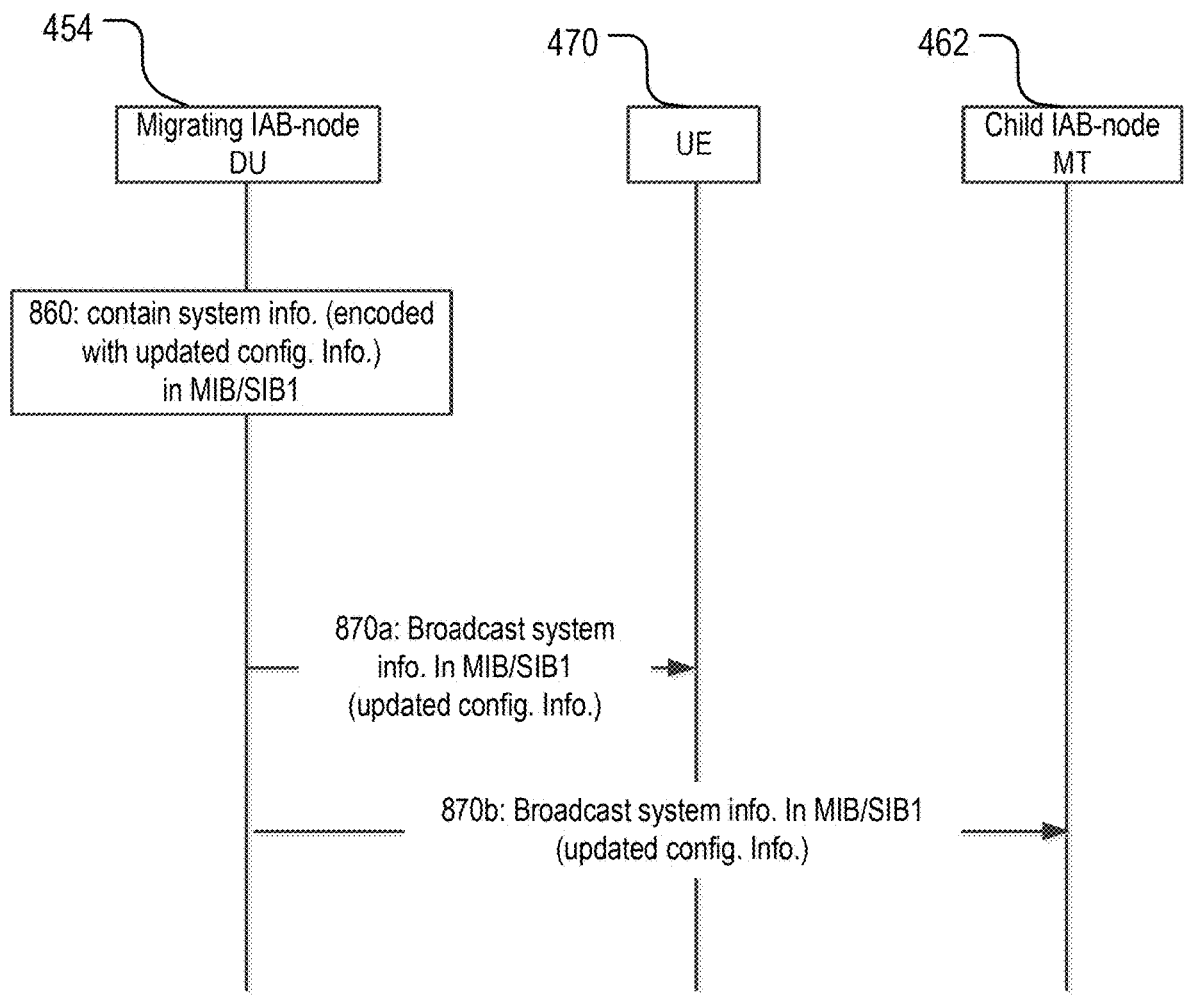
FIG. 8B shows an exemplary logic flow of the method for wireless communication in FIG. 7B.

FIGS. 8A and 8B show logic flows of various methods for broadcasting updated configuration information for a downstream device of a migrating IAB-node during inter-donor migration.

Referring to step 810 in FIG. 8A, an IAB-donor CU 802 may provide updated configuration information into system information which is contained in a system information block (SIB) other than SIB1 carried in a SystemInformation (SI) message, and encode the system information with the updated configuration information. In one implementation, the IAB-donor CU 802 may include a source IAB-donor CU. In another implementation, the IAB-donor CU 802 may include a target IAB-donor CU.

Referring to step 820 in FIG. 8A, the IAB-donor CU 802 may send the system information as a radio resource control (RRC) container to a migrating IAB-node distributed unit (DU) via F1-AP. The system information includes the updated configuration information.

Referring to step 830a in FIG. 8A, upon receiving the SIB message, the source IAB-donor CU 412 may periodically broadcast the SystemInformation (SI) message including the updated configuration information to the downstream UE 470. The updated configuration information may include one or more of the following: a new radio (NR) physical cell identifier (PCI), or a NR cell global identifier (CGI).

Referring to step 830b in FIG. 8A, upon receiving the SIB message, the source IAB-donor CU 412 may periodically broadcast the SystemInformation (SI) message including the updated configuration information to the downstream child IAB-node MT 462. The updated configuration information may include one or more of the following: a new radio (NR) physical cell identifier (PCI), or a NR cell global identifier (CGI).

In one implementation, step 830a may be performed earlier than step 830b. In another implementation, step 830a may be performed later than step 830b.

Optionally and alternatively, referring to step 860 in FIG. 8B, the migrating IAB-node distributed unit (DU) 454 may provide updated configuration information into system information which is contained in a master information block (MIB) or a system information block-1 (SIB1), and may encode the system information with the updated configuration information. Referring to step 870a in FIG. 8B, the migrating IAB-node DU 454 may periodically broadcast the system information contained in the MIB or the SIB1 to the downstream UE 470. Referring to step 870b in FIG. 8B, the migrating IAB-node DU 454 may periodically broadcast the system information contained in the MIB or the SIB1 to the downstream child IAB-node MT 462. The updated configuration information may include one or more of the following: a new radio (NR) physical cell identifier (PCI), or a NR cell global identifier (CGI). In one implementation, step 870a may be performed earlier than step 870b. In another implementation, step 870a may be performed later than step 870b.

Referring to FIG. 9, the present disclosure describes various embodiment of a method 900 for using an RRCReconfigeration message to update configuration information for a downstream device of a migrating IAB-node during inter-donor migration. In one implementation, the downstream device may include one or more user equipment (UE) and/or one or more child IAB-node mobile termination (MT). The updated configuration information may include at least one of a new radio (NR) physical cell identifier (PCI), a NR cell global identifier (CGI), or a Public Land Mobile Network (PLMN) Identity. In another implementation, when the downstream device includes a child IAB-node MT, the updated configuration information may include an internet protocol (IP) address.

The method 900 may include a portion or all of the following steps: step 910: providing, by a migrating IAB-node distributed unit (DU), updated configuration information into a RRCReconfigeration message; and step 920: sending, by the migrating IAB-node DU, the RRCReconfigeration message including the updated configuration information to the downstream device.

Figure 10:
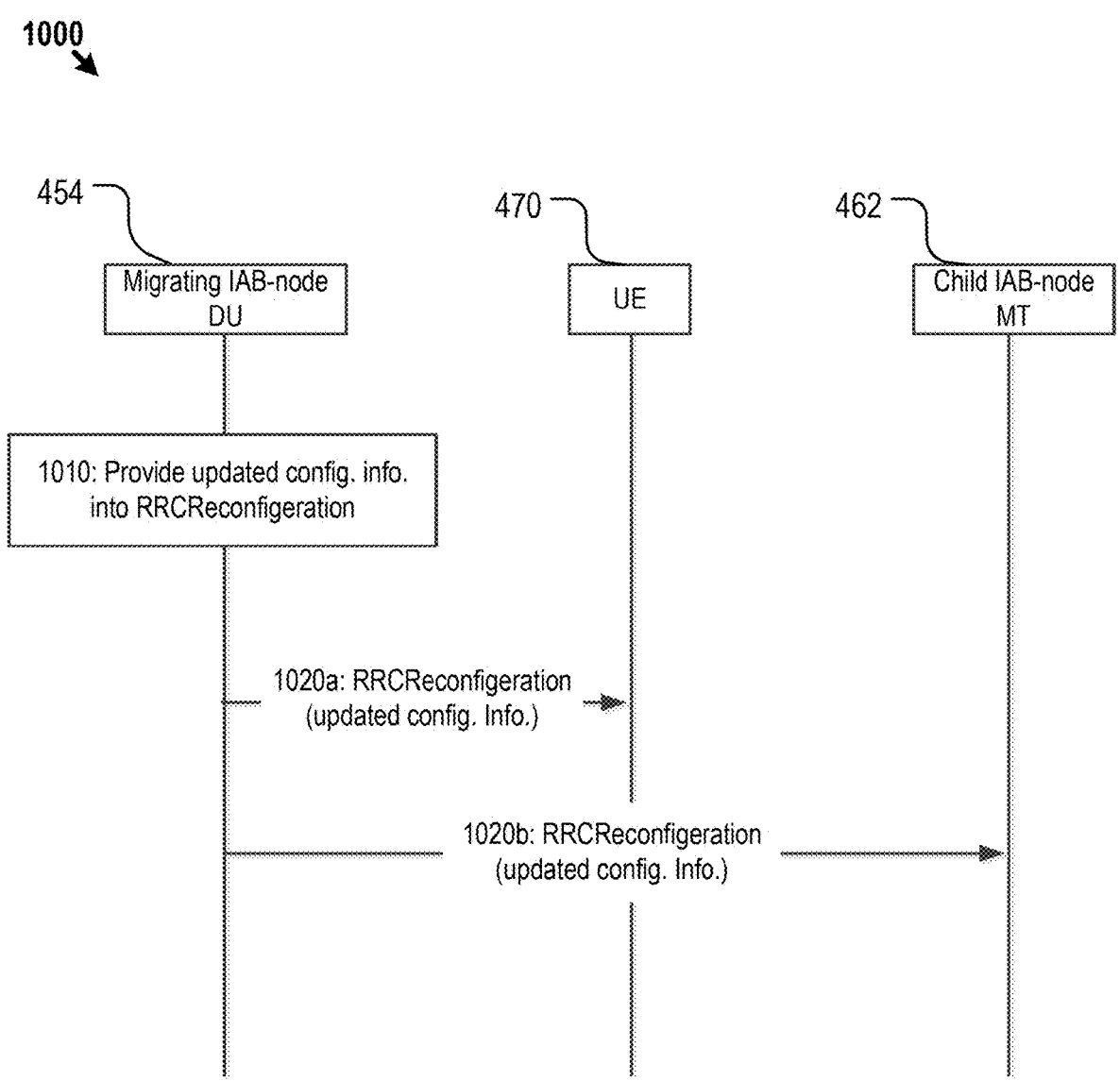
FIG. 10 shows an exemplary logic flow of the method for wireless communication in FIG. 9.

FIG. 10 shows a logic flow of a method 1000 for using a RRCReconfigeration message to update configuration information for a downstream device of a migrating IAB-node during inter-donor migration.

Referring to step 1010 in FIG. 10, the migrating IAB-node DU 454 may provide updated configuration information into a RRCReconfigeration message. The RRCReconfigeration message includes the updated configuration information.

Referring to step 1020a in FIG. 10, the migrating IAB-node DU 454 may send the RRCReconfigeration message including the updated configuration information to the downstream UE 470. The updated configuration information may include one or more of the following: a new radio (NR) physical cell identifier (PCI), a NR cell global identifier (CGI), or a Public Land Mobile Network (PLMN) Identity.

Referring to step 1020b in FIG. 10, the migrating IAB-node DU 454 may send the RRCReconfigeration message including the updated configuration information to the downstream child IAB-node MT 462. The updated configuration information may include one or more of the following: a new radio (NR) physical cell identifier (PCI), a NR cell global identifier (CGI), a Public Land Mobile Network (PLMN) Identity, or an internet protocol (IP) address. In another implementation, the updated configuration information may include an internet protocol (IP) address.

In one implementation, step 1020a may be performed earlier than step 1020b. In another implementation, step 1020a may be performed later than step 1020b.

Referring to FIG. 11, the present disclosure describes various embodiment of a method 1100 for using a backhaul adaptation protocol (BAP) control protocol data unit (PDU) to update configuration information for a downstream device of a migrating IAB-node during inter-donor migration. In one implementation, the downstream device may include one or more child IAB-node mobile termination (MT). The updated configuration information may include at least one of a new radio (NR) physical cell identifier (PCI), a NR cell global identifier (CGI), or a Public Land Mobile Network (PLMN) Identity.

The method 1100 may include a portion or all of the following steps: step 1110: providing, by a migrating IAB-node distributed unit (DU), updated configuration information into a backhaul adaptation protocol (BAP) control protocol data unit (PDU); and step 1120: sending, by the migrating IAB-node DU, the BAP control PDU including the updated configuration information to the downstream device.

Figure 12:
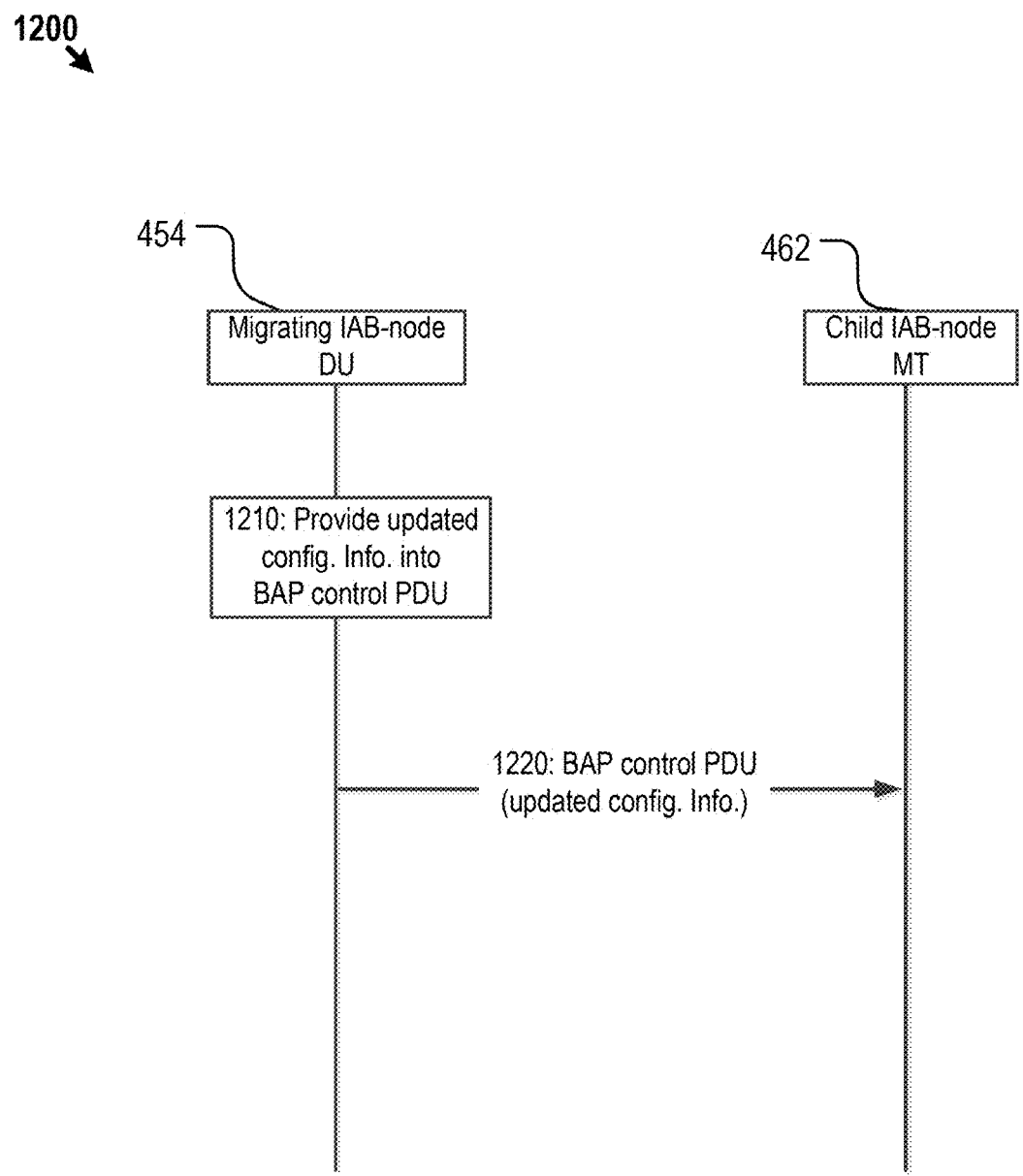
FIG. 12 shows an exemplary logic flow of the method for wireless communication in FIG. 11.

FIG. 12 shows a logic flow of a method 1200 for using a BAP control PDU to update configuration information for a downstream device of a migrating IAB-node during inter-donor migration.

Referring to step 1210 in FIG. 12, the migrating IAB-node DU 454 may provide updated configuration information into a BAP control PDU.

Referring to step 1220 in FIG. 12, the migrating IAB-node DU 454 may send the BAP control PDU to the downstream child IAB-node MT 462. The BAP control PDU includes the updated configuration information. The updated configuration information may include one or more of the following: a new radio (NR) physical cell identifier (PCI), a NR cell global identifier (CGI), or a Public Land Mobile Network (PLMN) Identity.

Referring to FIG. 13, the present disclosure describes various embodiment of a method 1300 for using a medium access control (MAC) control element (CE) to update configuration information for a downstream device of a migrating IAB-node during inter-donor migration. In one implementation, the downstream device may include one or more user equipment (UE) and/or one or more child IAB-node mobile termination (MT). The updated configuration information may include at least one of a new radio (NR) physical cell identifier (PCI), a NR cell global identifier (CGI), or a Public Land Mobile Network (PLMN) Identity.

The method 1300 may include a portion or all of the following steps: step 1310: providing, by a migrating IAB-node distributed unit (DU), updated configuration information into a medium access control (MAC) control element (CE), and step 1320: sending, by the migrating IAB-node DU, the MAC CE including the updated configuration information to the downstream device.

Figure 14:
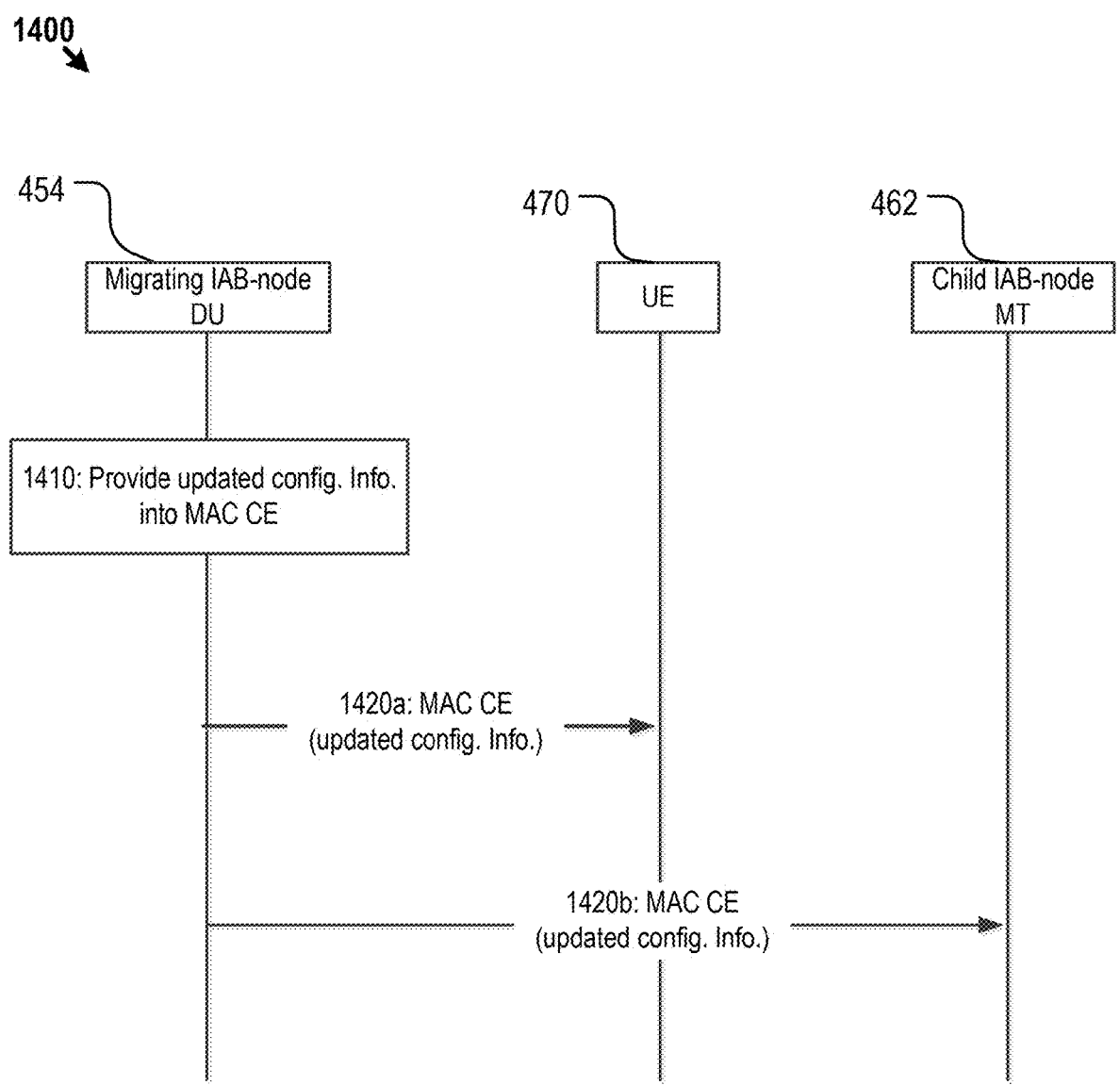
FIG. 14 shows an exemplary logic flow of the method for wireless communication in FIG. 13.

FIG. 14 shows a logic flow of a method 1400 for using a MAC CE to update configuration information for a downstream device of a migrating IAB-node during inter-donor migration.

Referring to step 1410 in FIG. 14, the migrating IAB-node DU 454 may provide updated configuration information into a MAC CE.

Referring to step 1420a in FIG. 14, the migrating IAB-node DU 454 may send the MAC CE including the updated configuration information to the downstream UE 470. The updated configuration information may include one or more of the following: a new radio (NR) physical cell identifier (PCI), a NR cell global identifier (CGI), or a Public Land Mobile Network (PLMN) Identity.

Referring to step 1420b in FIG. 14, the migrating IAB-node DU 454 may send the MAC CE including the updated configuration information to the downstream child IAB-node MT 462. The updated configuration information may include one or more of the following: a new radio (NR) physical cell identifier (PCI), a NR cell global identifier (CGI), or a Public Land Mobile Network (PLMN) Identity.

In one implementation, step 1420a may be performed earlier than step 1420b. In another implementation, step 1420a may be performed later than step 1420b.

The present disclosure describes methods, apparatus, and computer-readable medium for wireless communication. The present disclosure addressed the issues with updating configuration information for a downstream device of a migrating integrated access backhaul node (IAB-node) during inter-donor migration. The methods, devices, and computer-readable medium described in the present disclosure may facilitate the performance of wireless communication by using a dedicated RRC message, or broadcasting system information message, or using a RRCReconfigeration message, or using a BAP control PDU, or using a MAC CE to update configuration information for a downstream device of the migrating IAB-node during inter-donor migration, thus improving migration efficiency and overall wireless network performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
  updating configuration information for a downstream device of a migrating integrated access backhaul node (IAB-node) during an inter-donor migration from a source IAB-donor to a target IAB-donor by:
    providing, by a source IAB-donor central unit (CU), updated configuration information into system information which is contained in a system information block (SIB) other than SIB1 carried in a SystemInformation (SI) message, and encoding the system information with the updated configuration information; and
    sending, by the source IAB-donor CU, the system information including the updated configuration information as a radio resource control (RRC) container to a migrating IAB-node distributed unit (DU) via F1-AP, so that the migrating IAB-node DU forwards the system information including the updated configuration information through a dedicated RRC message to the downstream device.

2. The method according to claim 1, wherein:
  the downstream device comprises a user equipment (UE) or a child IAB-node mobile termination (MT).

3. The method according to claim 1, wherein:
  the updated configuration information comprises a new radio (NR) physical cell identifier (PCI).

4. The method according to claim 1, wherein:
  the updated configuration information comprises a NR cell global identifier (CGI).

5. A non-transitory computer-readable program medium storing instructions, wherein, the instructions, when executed by a processor, are configured to cause the processor to implement the method according to claim 1.

6. The non-transitory computer-readable program medium according to claim 5, wherein:
  the downstream device comprises a user equipment (UE) or a child IAB-node mobile termination (MT).

7. A method for wireless communication, comprising:
  updating configuration information for a downstream device of a migrating integrated access backhaul node (IAB-node) during an inter-donor migration from a source IAB-donor to a target IAB-donor by:
    providing, by a migrating IAB-node distributed unit (DU), updated configuration information into system information which is contained in a master information block (MIB) or a system information block-1 (SIB1), and encoding the system information with the updated configuration information; and
    sending, by the migrating IAB-node DU, the system information contained in the MIB or the SIB1 to the downstream device through a dedicated RRC message.

8. The method according to claim 7, wherein:
  the downstream device comprises a user equipment (UE) or a child IAB-node mobile termination (MT).

9. The method according to claim 7, wherein:
  the updated configuration information comprises a new radio (NR) physical cell identifier (PCI).

10. The method according to claim 7, wherein:
  the updated configuration information comprises a NR cell global identifier (CGI).

11. An apparatus comprising:
  a memory storing instructions; and
  a processor in communication with the memory, wherein, when the processor executes the instructions, the processor is configured to cause the apparatus to perform the method according to claim 7.

12. The apparatus according to claim 11, wherein:
  the downstream device comprises a user equipment (UE) or a child IAB-node mobile termination (MT).

13. The apparatus according to claim 11, wherein:
  the updated configuration information comprises a new radio (NR) physical cell identifier (PCI).

14. The apparatus according to claim 11, wherein:
  the updated configuration information comprises a NR cell global identifier (CGI).

15. A non-transitory computer-readable program medium storing instructions, wherein, the instructions, when executed by a processor, are configured to cause the processor to implement the method according to claim 7.

16. The non-transitory computer-readable program medium according to claim 15, wherein:
  the downstream device comprises a user equipment (UE) or a child IAB-node mobile termination (MT).

17. A source integrated access backhaul-donor central unit (IAB-donor CU) comprising:
  a memory storing instructions; and
  a processor in communication with the memory, wherein, when the processor executes the instructions, the processor is configured to cause the source IAB-donor CU to perform:
    updating configuration information for a downstream device of a migrating integrated access backhaul node (IAB-node) during an inter-donor migration from a source IAB-donor to a target IAB-donor by:

providing updated configuration information into system information which is contained in a system information block (SIB) other than SIB1 carried in a SystemInformation (SI) message, and encoding the system information with the updated configuration information; and sending the system information including the updated configuration information as a radio resource control (RRC) container to a migrating IAB-node distributed unit (DU) via F1-AP, so that the migrating IAB-node DU forwards the system information including the updated configuration information through a dedicated RRC message to the downstream device.

18. The source IAB-donor CU according to claim 17, wherein:

the downstream device comprises a user equipment (UE) or a child IAB-node mobile termination (MT).

19. The source IAB-donor CU according to claim 17, wherein:

the updated configuration information comprises a new radio (NR) physical cell identifier (PCI).

20. The source IAB-donor CU according to claim 17, wherein:

the updated configuration information comprises a NR cell global identifier (CGI).

* * * * *